Figure 1:
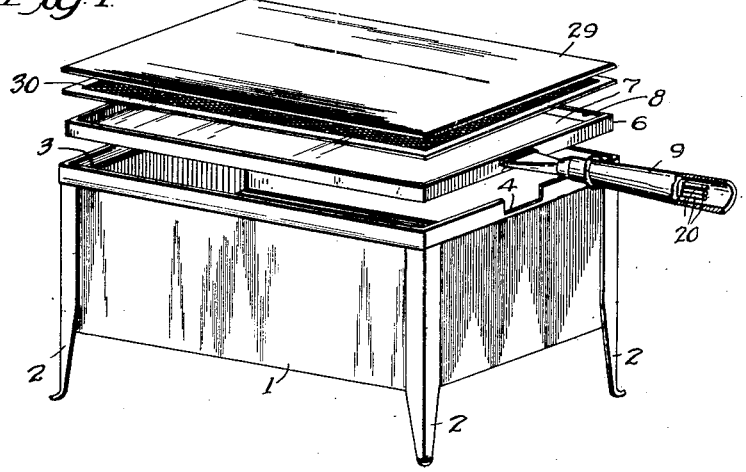

W. S. HADAWAY, Jr.
ELECTRIC STOVE.
APPLICATION FILED JAN. 28, 1913.

1,174,031. Patented Feb. 29, 1916.

WITNESSES

INVENTOR
William S. Hadaway Jr.
By
ATTORNEY

UNITED STATES PATENT OFFICE.

WILLIAM S. HADAWAY, JR., OF NEW ROCHELLE, NEW YORK.

ELECTRIC STOVE.

1,174,031.  Specification of Letters Patent.  Patented Feb. 29, 1916.

Application filed January 28, 1913. Serial No. 744,726.

*To all whom it may concern:*

Be it known that I, WILLIAM S. HADAWAY, Jr., a citizen of the United States, residing at New Rochelle, in the county of Westchester and State of New York, have invented new and useful Improvements in Electric Stoves, of which the following is a full, clear, concise, and exact description, reference being had to the accompanying drawing, forming a part of this specification.

My invention relates to electric stoves. In heating appliances of this character, it is desirable to utilize heat dissipated sometimes upwardly and sometimes downwardly from the heater. It is desirable also to use either side of the heater as the upper heating surface.

To attain these results advantageously, I propose as one of the objects of my invention to provide a heater having two heat conducting plates spaced apart by electric heating units, and held in close relation thereto to provide for an efficient conduction of heat from said units to each of said plates.

Another object of my invention is to provide an improved heater wherein the heating units are mechanically supported and firmly held in a water tight casing, said units serving in turn to reinforce said casing and maintain the walls thereof in proper spaced relation.

A further object is to provide a simple, compact table stove having separable parts relatively small in number which coöperate with each other in various ways, whereby a few parts are adapted to perform a variety of functions hitherto accomplished only by the use of a number of auxiliary utensils or heating devices.

Additional objects of the invention will be apparent from the description of the several embodiments thereof hereinafter given. Said embodiments as illustrated in the drawings represent the preferred forms of the invention. Other forms may, of course, be devised which fall within the scope of said invention.

Figure 2:
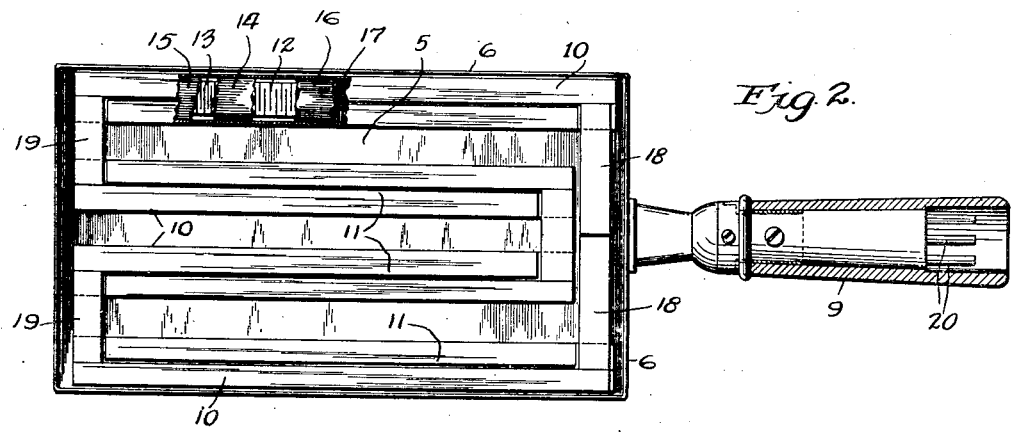
Figure 3:
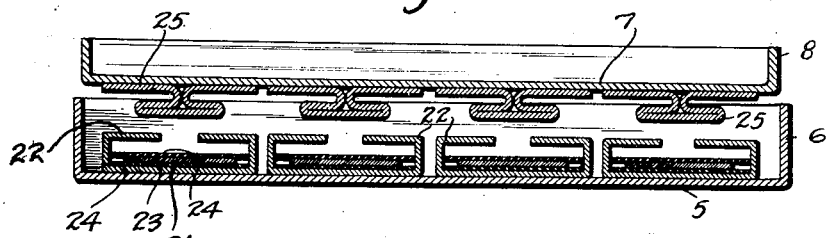
Figure 4:
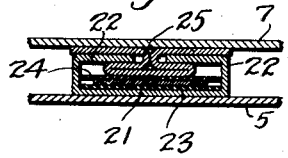
Figure 5:
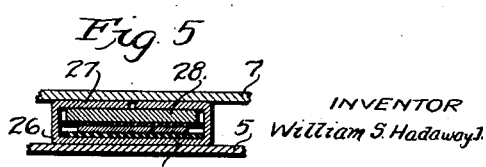

Figure 1 is an isometric drawing of the detached parts of the table stove. Fig. 2 is a plan view of one form of heater with one of the heating plates removed. Fig. 3 is a sectional elevation on an enlarged scale of another form of heater showing the cover detached from the base thereof. Fig. 4 is a sectional elevation of an assembled heating unit such as shown in Fig. 3. Fig. 5 is a sectional elevation of a further form thereof.

The electric stove in the preferred form illustrated is of rectangular outline and comprises a suitable base in the form of a pan 1, constructed preferably of sheet metal and supported by legs 2, the latter being of angle section, and being riveted or otherwise secured to said pan. The upper part of said pan is provided with a shoulder 3, by bending the metal outwardly and upwardly, the vertical flange thus formed being reinforced, if desired. At one end of the pan, the said vertical flange is cut away to form a notch 4.

The electric heater or heating element fits within the enlarged upper portion of the pan 1. Said heater comprises a rectangular sheet metal element or plate 5 having vertical flanges 6 within which fits a smaller sheet metal plate 7 having vertical flanges 8 of less height than the flanges 6. The upper and lower plates 7 and 5 constitute the heating surfaces of the stove, the electric heating units being arranged between said plates and in close thermal contact therewith, as hereinafter described more fully. The heater is provided with a handle 9 whereby it may be conveniently handled and inverted with respect to the position in which it is illustrated in Fig. 1, when it is desired to use the plate 5 as the upper heating surface. Said handle is received within the notch 4 when the heater rests on the shoulder 3. The circuit connections are made within said handle, as hereinafter described.

In Fig. 2 I have shown one arrangement of heater units wherein four units are provided, each of which has a sheet metal channel 10 integrally united to the plate 5, preferably by electrically welding. The flanges 11 of the channel are bent over to embrace between themselves and the base of the channel a pair of resistances 12, 13, preferably in the form of thin, flat, slotted metal strips superimposed one on the other. Said resistances are insulated from each other and from the supporting channel or carrier by strips of mica 14, 15, 16 of slightly greater width than said resistances and arranged between and on opposite sides thereof. A cover plate is provided in the form of a strip of metal 17 placed over the outer strip of sheet mica, said cover plate being firmly held in position by the bent over flanges 11. With the construction described it will be seen that the heating unit as a whole is very thin and compact, the carrier therefor being integrally united to one of the plates to be heated and in close contact with the other of said plates. The mica, although very thin, affords ample insulation and permits the heat to be conducted readily to the carrier and thence to the heating plates. Furthermore, the mica is capable of withstanding high temperatures and consequently the resistance may be worked at a high temperature, if desired.

The resistance strips are connected at their ends by suitable conductors 18, 19, the upper resistances being thus connected in series and the lower resistances also being connected in series. The upper resistance gives one heat and the lower resistance another heat, the two, when connected in parallel, giving a third heat. The circuit connections are made by additional conductors not shown, which pass out through the hollow handle 9 to the terminal pins 20, mounted in the open end of said handle.

The heating plate 7 is held in place by integrally uniting the tops of the flanges 8 thereof with the tops of the flanges 6 of the bottom plate, thus providing a water-tight structure. The flanges may be united by welding or in any other suitable manner. In the construction described, the units are integrally united to the bottom plate and are held firmly against the top plate to which, however, they are not integrally united. Under certain circumstances it is desirable to have said heater units integrally united to both top and bottom plates and such a construction is illustrated in Figs. 3 and 4.

In Fig. 3 the bottom plate 5 has a plurality of sheet metal channels 21 welded thereto, said channels having the upper part of their flanges 22 bent over horizontally, as shown. Within said channel a resistance 23 is located, being insulated by strips of mica 24, arranged above and below the same in a manner similar to that previously described in connection with Fig. 2. Two superimposed resistances may be employed, if desired, arranged as shown in said figure.

The upper plate 7 has a plurality of locking strips 25 welded thereto. Said locking strips are shaped as shown and are arranged to fit within the flanges 22 whereby the upper and lower plates may be positively locked together when assembled. This assembling is accomplished by sliding the upper plate along the lower plate with the parts interlocked about as shown in Fig. 4.

With the units thus assembled, the flange 8 fits down within the flange 6 and may be welded thereto to form a water-tight construction. Prior to said welding, however, the upper plate is firmly pressed toward the lower plate in a press, whereby the units are somewhat flattened out and firmly interlocked, so that the upper plate and the lower plate cannot spring away from each other or buckle when expansion or contraction occurs, due to variations in temperature.

With the arrangement described it will be seen that not only are the upper and lower plates mechanically interlocked but the resistances are held in close thermal contact with both of said plates independently of the union at the edges. Furthermore the resistance units may be arranged as close together as desired, whereby the aggregate area thereof may be substantially equal to the desired area or areas to be heated. The heating plates being united to opposite sides of each unit and not to some element interposed between said units, it is possible to make use of the entire available area for the assembling of heater units.

In Fig. 5 I have shown a modified arrangement wherein the channel members 26 may have their bent over flanges 27 welded directly to the top plate 7 after the unit has been completely assembled and without having to slide the top plate along the bottom plate to fit the parts together. In this construction, the resistance and the insulation therefor are about the same as that described in connection with Fig. 4. A heavy cover plate 28, however, is placed over the upper strip of mica and the flanges 27 are bent down over said cover plate. The top plate 7 may then be welded directly to said bent over flanges, preferably by electric welding, the cover plate 28 having sufficient mass to prevent injury to the resistance during the welding operation. In this latter construction, the upper and lower plates are positively held in close thermal contact with the resistance and cannot spring away from each other or become distorted in such a manner as to impair the thermal efficiency of the union.

Throughout the preceding description it is to be understood that I have used the expressions, top and bottom plates, merely for convenience, as in actual use the heater is often inverted. When it is in the position shown in Fig. 1, the vertical flanges are of sufficient height to form in effect a pan which may be filled with water for the purpose of poaching eggs, etc. It may also be used as a frying pan for frying bacon and eggs, for example, or the surface may be used simply as a stove to heat water, coffee, etc., the coffee-pot or other utensil resting directly thereon, although the heater is usually inverted for this purpose to make use of the flat under surface which is free from flanges. Said latter surface may also be used for griddle cakes and for various other purposes which will readily suggest themselves. I prefer, however, to provide an additional plate 29, preferably of aluminum, which may be used for griddle cakes and similar purposes, said plate resting directly on the flat surface of the heater. I provide also a screen 30 which may be placed on the heater and used in the toasting of bread and for similar purposes, the bread resting directly against the screen and being thereby elevated somewhat above the surface of the heater. The heat dissipated from the lower surface of the heater may also be used for grilling or broiling chops, bacon, etc., the meat in this case being supported in the customary manner within the pan. The heater may be used further as an immersion heater for heating water by simply removing the heater from the rest of the stove and plunging it into the water to be heated. It may be readily washed at any time by simply stirring it in soapy water with the current on, the heater keeping the water hot. Upon removing it from the water it dries rapidly in the air if the current is left on for a short interval.

From the above few suggestions it will be seen that a stove constructed in accordance with my invention is adapted for a great variety of uses, particularly in household work, although of course, it is not limited to this class of service, nor to any of the above suggested uses. Furthermore, the invention is not limited to the embodiments thereof described and illustrated, as various other forms may be devised and various changes may be made in the details of construction described herein. Accordingly, I do not limit myself to said constructions but desire to cover broadly any suitable equivalent means for accomplishing the desired results and falling within the scope of the appended claims.

What I claim as new and desire to secure by Letters Patent of the United States is:—

1. In an electric heater, a pair of heating plates and a plurality of resistance units arranged between said plates and integrally united to one of them.

2. In an electric heater, a pair of heating plates and a plurality of resistance units arranged between said plates and integrally united to one of them, said plates being united at their peripheries to form a water-tight construction.

3. In an electric heater, a pair of heating plates and a plurality of resistance units arranged between said plates, said units being secured to each of said plates, whereby they serve to maintain the same in proper spaced relation regardless of expansion and contraction, due to heat variations.

4. An electric heater for a table stove comprising a flat utensil consisting of an upper and a lower heating plate, electric heating units arranged between said plates and integrally united thereto, and a flange at the periphery of said plates to form a pan thereof.

5. An electric table stove having a supporting base open at the top and a removable, reversible closure for said open top, said closure comprising an electric heater either side of which may be used as a heating surface.

6. A heating element for a stove comprising a pair of plates each having the periphery thereof struck up in the form of a flange, one of said plates fitting within the other, the inner plate having a shorter flange than the outer plate, the outer edges of said flanges being flush and integrally united, whereby a chamber is formed between said plates, and a plurality of heating units arranged within said chamber and integrally united to said plates.

7. In an electric heater, a pair of heating plates and a plurality of resistance units arranged between said plates, the aggregate area of said units being substantially equal to the heating area of said plates, said plates being integrally united to opposite sides of said heating units, whereby said plates are maintained in good thermal conducting relation with said units over the entire desired heating area.

8. An electric stove comprising a suitable receptacle, and an electric heater supported thereby and closing the same, said heater being reversible and having one side flat and the opposite side flanged at the margins to form a pan, whereby either side of said heater may be used as the upper heating surface, and whereby heat may be utilized either upwardly or downwardly.

9. An electric heater comprising a heating plate, a metallic channel integrally united thereto, a second heating plate having a metallic locking element integrally united thereto, a resistance arranged within said channel, said locking element also fitting within said channel to lock said plates to each other, and means for insulating said resistance from its metallic casing.

10. A heater for a table stove comprising a flanged upper plate and a flanged lower plate, said plates being integrally united with each other by their flanges, said lower plate having a plurality of parallel sheet metal channels welded thereto, a resistance in each of said channels, mica strips on opposite sides of said resistance to insulate the same, said upper plate having a plurality of locking elements welded thereto, each element comprising a middle web, and a pair of oppositely extending flanges, said flanges being received within the upper part of said channels whereby said plates are positively locked together independently of their flanges.

11. An electric heater comprising resistors, sheet metal carriers therefor from which said resistors are insulated and a pair of heating plates for locating and supporting said carriers, the latter serving to conduct heat to both of said plates.

12. An electric heater comprising resistors, insulation on opposite sides of each resistor, sheet metal carriers for positioning and holding said insulation against the respective resistors and a pair of heating plates for locating and supporting said carriers, said plates being united at their edges to form a water-tight inclosure, and said carriers serving to reinforce said plates and to maintain them in proper spaced relation.

13. A device of the character described, comprising a member to be heated, flexible strips integrally united with said member, a resistance element arranged between said strips and held in place by bent-over portions of said strips, and an inclosing casing for said strips and said resistance element having a water-tight connection with said first named member.

14. In an electric resistance device, a plurality of strips of resistance material, means for insulating said strips of resistance material, a plurality of metallic channels inclosing said insulating means, said channels being arranged to compress said insulating means upon said resistance material, means for electrically connecting said strips of resistance material, means for mechanically connecting said channels, and means for inclosing said channels in a liquid-tight casing.

15. In an electric resistance device, a plurality of strips of slotted ribbon resistance material, sheets of insulation of a greater width than said strips of resistance material on opposite sides of said resistance material, a plurality of metallic plates resting upon certain of said sheets of insulation, a plurality of metallic channels each inclosing a plurality of said previously mentioned elements, means for electrically connecting said strips of resistance material, means for mechanically connecting said channels, and means coöperating with said last mentioned means to form a liquid-tight casing for the channels.

In witness whereof, I have hereunto subscribed my name in the presence of two witnesses.

WILLIAM S. HADAWAY, Jr.

Witnesses:
   EDWIN N. LIGHTFOOT,
   GEO. B. JONES.